US008630295B1

(12) United States Patent
Ayyangar et al.

(10) Patent No.: US 8,630,295 B1
(45) Date of Patent: Jan. 14, 2014

(54) CONSTRAINT-BASED LABEL SWITCHED PATH SELECTION WITHIN A COMPUTER NETWORK

(75) Inventors: Arthi R. Ayyangar, Santa Clara, CA (US); Chaitanya Kodeboyina, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 641 days.

(21) Appl. No.: 12/540,402

(22) Filed: Aug. 13, 2009

Related U.S. Application Data (63) Continuation of application No. 10/860,183, filed on Jun. 3, 2004, now Pat. No. 7,606,235.

(51) Int. Cl.
*H04L 12/28* (2006.01)
*H04L 12/56* (2011.01)
*H04J 3/16* (2006.01)
*H04J 3/22* (2006.01)

(52) U.S. Cl.
USPC .................. 370/395.3; 370/409; 370/466

(58) Field of Classification Search
USPC ......... 370/351, 220, 396, 352, 229, 331, 409, 370/389, 395, 395.3, 397, 466, 467, 469; 709/202
See application file for complete search history.

(56) References Cited

U.S. PATENT DOCUMENTS

| | | | |
|---|---|---|---|
| 6,363,319 B1 | 3/2002 | Hsu | |
| 6,522,667 B1 * | 2/2003 | Oda et al. | 370/474 |
| 6,538,416 B1 | 3/2003 | Hahne et al. | |
| 6,618,397 B1 * | 9/2003 | Huang | 370/474 |
| 6,680,943 B1 * | 1/2004 | Gibson et al. | 370/392 |
| 6,728,261 B1 | 4/2004 | Sasson et al. | |
| 6,731,649 B1 | 5/2004 | Silverman | |
| 6,751,218 B1 * | 6/2004 | Hagirahim et al. | 370/390 |
| 6,757,298 B1 * | 6/2004 | Burns et al. | 370/473 |
| 6,765,921 B1 * | 7/2004 | Stacey et al. | 370/401 |
| 6,778,494 B1 * | 8/2004 | Mauger | 370/230 |
| 6,778,531 B1 * | 8/2004 | Kodialam et al. | 370/390 |
| 6,798,785 B1 * | 9/2004 | Sasson et al. | 370/466 |
| 6,842,454 B2 * | 1/2005 | Metcalf, III | 370/392 |
| 6,882,643 B1 * | 4/2005 | Mauger et al. | 370/389 |

(Continued)

OTHER PUBLICATIONS

Ayyangar et al., "Inter-region MPLS Traffic Engineering", Jun. 2003, Network Working Group Internet Draft, draft-ayyangar-inter-region-te-00.txt, 21 pp.

(Continued)

*Primary Examiner* — Ayaz Sheikh
*Assistant Examiner* — Hoang-Chuong Vu
(74) *Attorney, Agent, or Firm* — Shumaker & Sieffert, P.A.

(57) ABSTRACT

Techniques are described for providing QoS guarantees when coupling layer two (L2) networks via an intermediate Multi-protocol Label Switching (MPLS) network. A network device, such as a router, receives a request to transport data from an L2 connection. The request specifies one of more characteristics of the L2 connection, such as bandwidth, color, end-to-end delay, jitter, a security requirement, or a classification of traffic for the L2 connection. The network device selects a label switched path (LSP) through the MPLS network based on the characteristics of the L2 connection, and forwards the data from the L2 connection via the selected LSP. In this manner, an LSP and, in particular, one or more forwarding next hops for the LSP, is selected that provides a "virtual" L2 connection, or pseudo-wire, that more closely emulates a direct L2 connection between the L2 networks.

47 Claims, 5 Drawing Sheets

(56) References Cited

U.S. PATENT DOCUMENTS

| | | | |
|---|---|---|---|
| 6,885,677 B1* | 4/2005 | Klevans | 370/466 |
| 6,931,025 B1* | 8/2005 | Masuda | 370/466 |
| 6,937,598 B1 | 8/2005 | Hagirahim et al. | |
| 6,956,821 B2* | 10/2005 | Szviatovszki et al. | 370/237 |
| 6,963,561 B1* | 11/2005 | Lahat | 370/356 |
| 6,993,021 B1* | 1/2006 | Chuah et al. | 370/389 |
| 7,002,993 B1* | 2/2006 | Mohaban et al. | 370/471 |
| 7,013,318 B2* | 3/2006 | Rosengard et al. | 715/255 |
| 7,027,450 B2* | 4/2006 | Collette et al. | 370/401 |
| 7,031,312 B1* | 4/2006 | Jayakumar et al. | 370/392 |
| 7,039,706 B1 | 5/2006 | Parker et al. | |
| 7,046,669 B1* | 5/2006 | Mauger et al. | 370/393 |
| 7,061,911 B2* | 6/2006 | Furuno | 370/392 |
| 7,065,084 B2* | 6/2006 | Seo | 370/392 |
| 7,082,102 B1* | 7/2006 | Wright | 370/229 |
| 7,164,679 B2 | 1/2007 | Kotha et al. | |
| 7,184,434 B2* | 2/2007 | Ganti et al. | 370/389 |
| 7,197,033 B2* | 3/2007 | Reeves et al. | 370/389 |
| 7,317,731 B2* | 1/2008 | Seddigh et al. | 370/419 |
| 7,319,700 B1 | 1/2008 | Kompella | |
| 7,324,453 B2 | 1/2008 | Wu et al. | |
| 7,333,509 B1* | 2/2008 | Gadagottu | 370/467 |
| 7,336,617 B1* | 2/2008 | Liu | 370/252 |
| 7,336,648 B1* | 2/2008 | Sasagawa | 370/351 |
| 7,369,571 B2* | 5/2008 | Choudhury et al. | 370/466 |
| 7,394,820 B1* | 7/2008 | Dianda | 370/401 |
| 7,418,493 B1* | 8/2008 | Charny et al. | 709/224 |
| 7,477,657 B1* | 1/2009 | Murphy et al. | 370/468 |
| 7,489,695 B1* | 2/2009 | Ayyangar | 370/396 |
| 7,539,210 B2* | 5/2009 | Iovanna et al. | 370/468 |
| 7,599,349 B2 | 10/2009 | Vasseur et al. | |
| 7,856,509 B1* | 12/2010 | Kodeboyina | 709/238 |
| 2001/0019554 A1* | 9/2001 | Nomura et al. | 370/389 |
| 2002/0136223 A1* | 9/2002 | Ho | 370/395.51 |
| 2002/0176370 A1* | 11/2002 | Ohba et al. | 370/252 |
| 2003/0028670 A1* | 2/2003 | Lee et al. | 709/241 |
| 2003/0028818 A1* | 2/2003 | Fujita | 714/4 |
| 2003/0103510 A1 | 6/2003 | Svanberg et al. | |
| 2003/0108051 A1* | 6/2003 | Bryden et al. | 370/395.54 |
| 2003/0117950 A1* | 6/2003 | Huang | 370/220 |
| 2003/0118024 A1* | 6/2003 | Lee et al. | 370/395.1 |
| 2003/0118026 A1* | 6/2003 | Kuhl et al. | 370/395.21 |
| 2003/0118047 A1* | 6/2003 | Collette et al. | 370/464 |
| 2003/0137971 A1* | 7/2003 | Gibson et al. | 370/351 |
| 2003/0156583 A1* | 8/2003 | Prager et al. | 370/369 |
| 2003/0185217 A1* | 10/2003 | Ganti et al. | 370/395.5 |
| 2003/0204617 A1* | 10/2003 | Buchsbaum et al. | 709/236 |
| 2003/0210705 A1* | 11/2003 | Seddigh et al. | 370/419 |
| 2004/0004955 A1* | 1/2004 | Lewis | 370/351 |
| 2004/0008718 A1* | 1/2004 | English et al. | 370/442 |
| 2004/0010617 A1 | 1/2004 | Akahane et al. | |
| 2004/0042398 A1* | 3/2004 | Peleg et al. | 370/230 |
| 2004/0044789 A1 | 3/2004 | Angel et al. | |
| 2004/0160958 A1* | 8/2004 | Oh | 370/395.1 |
| 2004/0202171 A1* | 10/2004 | Hama | 370/395.1 |
| 2005/0010685 A1* | 1/2005 | Ramnath et al. | 709/238 |
| 2005/0013242 A1* | 1/2005 | Chen et al. | 370/228 |
| 2005/0125490 A1* | 6/2005 | Ramia | 709/202 |
| 2005/0160171 A1* | 7/2005 | Rabie et al. | 709/227 |
| 2005/0169270 A1* | 8/2005 | Mutou et al. | 370/390 |
| 2005/0169313 A1 | 8/2005 | Okamura et al. | |
| 2005/0195741 A1* | 9/2005 | Doshi et al. | 370/230 |
| 2005/0243833 A1* | 11/2005 | Choudhury et al. | 370/395.1 |
| 2005/0259586 A1* | 11/2005 | Hafid et al. | 370/241 |
| 2005/0265258 A1 | 12/2005 | Kodialam et al. | |
| 2006/0013232 A1* | 1/2006 | Xu et al. | 370/396 |
| 2006/0018326 A1* | 1/2006 | Yucel | 370/397 |
| 2006/0034328 A1* | 2/2006 | Aldermeshian et al. | 370/466 |
| 2006/0039364 A1* | 2/2006 | Wright | 370/352 |
| 2006/0039391 A1* | 2/2006 | Vasseur et al. | 370/409 |
| 2006/0126536 A1* | 6/2006 | Patel et al. | 370/254 |
| 2006/0159009 A1* | 7/2006 | Kim et al. | 370/216 |
| 2006/0182119 A1* | 8/2006 | Li et al. | 370/395.52 |
| 2006/0203717 A1* | 9/2006 | Puppa et al. | 370/216 |
| 2006/0209785 A1* | 9/2006 | Iovanna et al. | 370/351 |
| 2006/0233137 A1* | 10/2006 | Dantu et al. | 370/331 |
| 2007/0019676 A1* | 1/2007 | Kompella | 370/468 |
| 2007/0133406 A1* | 6/2007 | Vasseur | 370/230 |
| 2007/0177505 A1* | 8/2007 | Charrua et al. | 370/230 |
| 2007/0268821 A1* | 11/2007 | Levit et al. | 370/223 |
| 2007/0268909 A1* | 11/2007 | Chen et al. | 370/395.21 |
| 2008/0019266 A1* | 1/2008 | Liu et al. | 370/228 |
| 2008/0049776 A1* | 2/2008 | Wiley et al. | 370/419 |
| 2008/0101239 A1* | 5/2008 | Goode | 370/235 |
| 2008/0144632 A1* | 6/2008 | Rabie et al. | 370/395.5 |
| 2008/0168510 A1* | 7/2008 | Small et al. | 725/100 |
| 2008/0259936 A1* | 10/2008 | Hussain et al. | 370/397 |
| 2009/0003200 A1* | 1/2009 | So | 370/229 |
| 2009/0296713 A1* | 12/2009 | Kompella | 370/392 |
| 2010/0246603 A1* | 9/2010 | Rabie et al. | 370/466 |
| 2011/0199938 A1* | 8/2011 | Kompella | 370/254 |

OTHER PUBLICATIONS

Office Action for U.S. Appl. No. 12/491,800 dated May 28, 2010, 24 pp.

Response to Office Action for U.S. Appl. No. 12/491,800 dated Aug. 27, 2010, 12 pp.

Office Action for U.S. Appl. No. 12/508,375 dated Jun. 2, 2010, 13 pp.

Response with Terminal Disclaimer to Office Action for U.S. Appl. No. 121508,375 dated Aug. 18, 2010, 3 pp.

D. Awduche et al., "RFC 3209—RSVP-TE: Extensions to RSVP for LSP Tunnels," Network Working Group, Dec. 2001, 47 pgs.

RSVP-TE: Resource Reservation Protocol—Traffic Extension, Javvin Company, 2 pgs, printed Feb. 14, 2005.

U.S. Appl. No. 10/928,572, entitled "Traffic Engineering Using Extended Bandwidth Accounting Information," filed Aug. 27, 2004.

U.S. Appl. No. 10/963,412, entitled "Automatic LSP Stitching With Protocol Signaling," filed Oct. 12, 2004.

U.S. Appl. No. 10/973,677, entitled RSVP-Passive Interfaces for Traffic Engineering Peering Links in MPLS Networks, filed Oct. 26, 2004.

Quality of Service and Traffic Engineering Using Multiprotocol Label Switching; R. Jain—ETRI, Korea, 90 pages, Aug. 1999.

QoS-Guaranteed DiffServ-Aware-MPLS Traffic Engineering with Controlled Bandwidth Borrowing; Y. Kim, C. Kim—Lecture Notes in Computer Science, 13 pages, 2004.

RFC 3035; MPLS Using LDP and ATM VC Switching; 18 pages, 2001.

A Solution for Managing Quality of Service in Internet Protocol Networks; M. Vapa—IEEE Communications Magazine, 91 pages, 1998.

Advance Reservations of Bandwidth in Computer Networks; L.O. Burhard—177 pages—2004—Citeseer.

An MPLS-Based Quality of Service Architecture for Hetrogenous Networks; S. Raghavan—107 pages—2001—Citeseer.

IP/MPLS based VPNs, Layer-3 vs Layer-2; Ahmed Abdelhalim, Foundery Networks, 16 pages, 2002.

QoS and Traffic Engineering; MPLS, DiffServ and Constraint Based Routing; ASG Mittal—31 pages—2000.

\* cited by examiner

CONSTRAINT-BASED LABEL SWITCHED PATH SELECTION WITHIN A COMPUTER NETWORK

CROSS REFERENCE TO RELATED APPLICATIONS

This application is a continuation of U.S. application Ser. No. 10/860,183, filed Jun. 3, 2004, the entire content of which is incorporated herein by reference.

TECHNICAL FIELD

The principles of the invention relate to computer networks and, more particularly, to techniques for providing call admission control within computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem or wireless access point. Traditional L2 networks include Asynchronous Transfer Mode (ATM) networks, Frame Relay networks, networks using High Level Data Link Control (HDLC), Point-to-Point (PPP) connections, PPP sessions over Layer 2 Tunneling Protocol (L2TP) tunnels, and Virtual Local Area Networks (VLANs).

Techniques may be used over some L2 and layer three (L3) networks to enable reservation of resources for packet flows from a source device to a destination device. By using one such technique, namely Multi-protocol Label Switching (MPLS), a source device can request a path through a network, i.e., a Label Switched Path (LSP). An LSP defines one or more distinct, dedicated, and guaranteed paths through the network to carry MPLS packets from a source to a destination. An LSP identifier associated with a particular LSP is affixed to packets that travel through the network via the LSP. A given LSP may define one or more paths between the source and destination, and each path may be used to carry MPLS network traffic associated with the LSP. Consequently, as used herein, an "LSP" refers to a defined set of one or more paths associated with a common flow of MPLS traffic, while an "path" refers to a particular network path associated with the LSP. As used herein, an LSP, therefore, may also be viewed as an MPLS tunnel having one or more paths.

In some instances, an MPLS network is used as an intermediate transport network between two or more L2 networks in order to allow communication between the L2 networks. In this manner, an LSP may be viewed as a virtual direct link created between the L2 networks, eliminating the need for expensive direct connections between the L2 networks.

In addition to providing a dedicated path through the network, MPLS-enabled routers may employ resource reservation techniques in an attempt to establish the LSP to support a specified Quality-of-Service (QoS) class having a required level of communication throughput, typically including a defined bandwidth allocation. The MPLS-enabled routers establish a defined route within the network able to commit the resources to satisfy the specified QoS class. Devices often employ resource reservation techniques to support transmission of real-time data, such as video or voice data, over packet-based networks.

L2 networks, however, typically have stringent Quality-of-Service (QoS) requirements, such as a guaranteed level of communication throughput, e.g., bandwidth. Intermediate MPLS networks generally are unable to meet these stringent QoS requirements associated with L2 networks. The lack of QoS guarantees by the intermediate MPLS network may lead to overall network inefficiencies or communication errors.

SUMMARY

In general, the invention is directed to techniques for providing QoS guarantees when coupling layer two (L2) networks via an intermediate Multi-protocol Label Switching (MPLS) network. A Label Switched Path (LSP) through the intermediate MPLS network is selected that most closely emulates a direct L2 connection between the L2 networks by exhibiting characteristics in accordance with L2 constraint information. In accordance with the principles of the invention, the L2 constraint information may include bandwidth, color, end-to-end delay, jitter, security requirements, classification of traffic, LSP selection parameters, or other networking characteristics.

When transporting data between the L2 networks, the MPLS network selects the LSP and, in particular, one or more forwarding next hops associated with the LSP, that exhibits network characteristics that most closely satisfy L2 constraint information similar to that of a direct L2 connection between the networks. Because the LSP emulates a direct L2 connection between L2 networks, the MPLS network is essentially transparent to the L2 networks. Consequently, the MPLS network provides a "virtual" direct L2 connection, or pseudowire, that emulates a direct L2 connection between the L2 networks.

In practice, a customer edge router of the L2 network sends the L2 constraint information and an admission request to a provider edge router of the MPLS network. A call admission control (CAC) module of the provider edge router selects an appropriate LSP based on L2 constraint information provided by the customer edge router, thereby "admitting" an L2 connection of the L2 network into the MPLS network. Moreover, the CAC module is invoked during route resolution and applied "per-path" basis, i.e., to each path for each LSP coupling the L2 networks. In particular, the CAC module determines whether any of the LSPs define a path having an associated next hop that satisfies the L2 constraint information for the L2 connection being admitted in the MPLS network. If so, the LSP is selected, and the identified next hop of the LSP is selected as the forwarding next hop for the L2 connection being admitted. In this manner, the L2 connection is admitted into the MPLS network, and data from the L2 connection is transported via the selected LSP using the identified next hop.

Once the LSP and the appropriate forwarding next hop have been selected, the provider edge router accounts for the resources, e.g., bandwidth, within the MPLS network utilized by the admitted L2 connection. The provider edge router utilizes this accounting to monitor and adjust the resources available for admission of other L2 connections from the L2 networks.

In one embodiment, a method comprises receiving a request to transport data from a layer two (L2) connection, wherein the request specifies constraint information for one of more characteristics of the L2 connection. The method further comprises selecting an LSP based on the constraint information, and forwarding the data from the L2 connection via the selected LSP.

In another embodiment, a method comprises performing route resolution within a network router to identify one or more forwarding next hops for an LSP based on constraint information associated with a layer two (L2) connection, and forwarding network traffic from the L2 connection in accordance with the identified one or more forwarding next hops.

In another embodiment, a method comprises issuing a call admission request from a first network device to a second network device associated with a packet-based network, wherein the call admission request requests transportation of data from an L2 connection and specifies one or more characteristics of the L2 connection. The method further comprises receiving a call admission message in response to the call admission request, wherein the call admission message specifies a label associated with a LSP selected based on the characteristics of the L2 connection. The method further comprises assigning the label to the data of the L2 connection to form MPLS packets, and forwarding the MPLS packets to the network device associated with the packet-based network.

In a further embodiment, a network apparatus comprises a control unit that selects an LSP based on constraint information for one of more characteristics of the layer two (L2) connection, and forwards data from the L2 connection via the selected LSP.

In a further embodiment, a system comprises a first L2 network having a network device and at least one L2 connection, a second L2 network, and a packet-based network coupling the first L2 network and the second L2 network, wherein the packet-based network includes a router to receive a request from the network device of the first L2 network to transport data over the L2 connection to the second L2 network. In particular, the request specifies one of more characteristics of the L2 connection, and the router selects an LSP based on the characteristics of the L2 connection and forwards the data from the L2 connection to the second L2 network via the selected LSP.

In yet another embodiment, a computer-readable medium comprises instructions. The instructions cause a programmable processor to receive a request to transport data from a layer two (L2) connection, wherein the request specifies constraint information for one of more characteristics of the L2 connection. The instructions further cause the programmable processor to select an LSP based on the constraint information, and forward the data from the L2 connection via the selected LSP.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
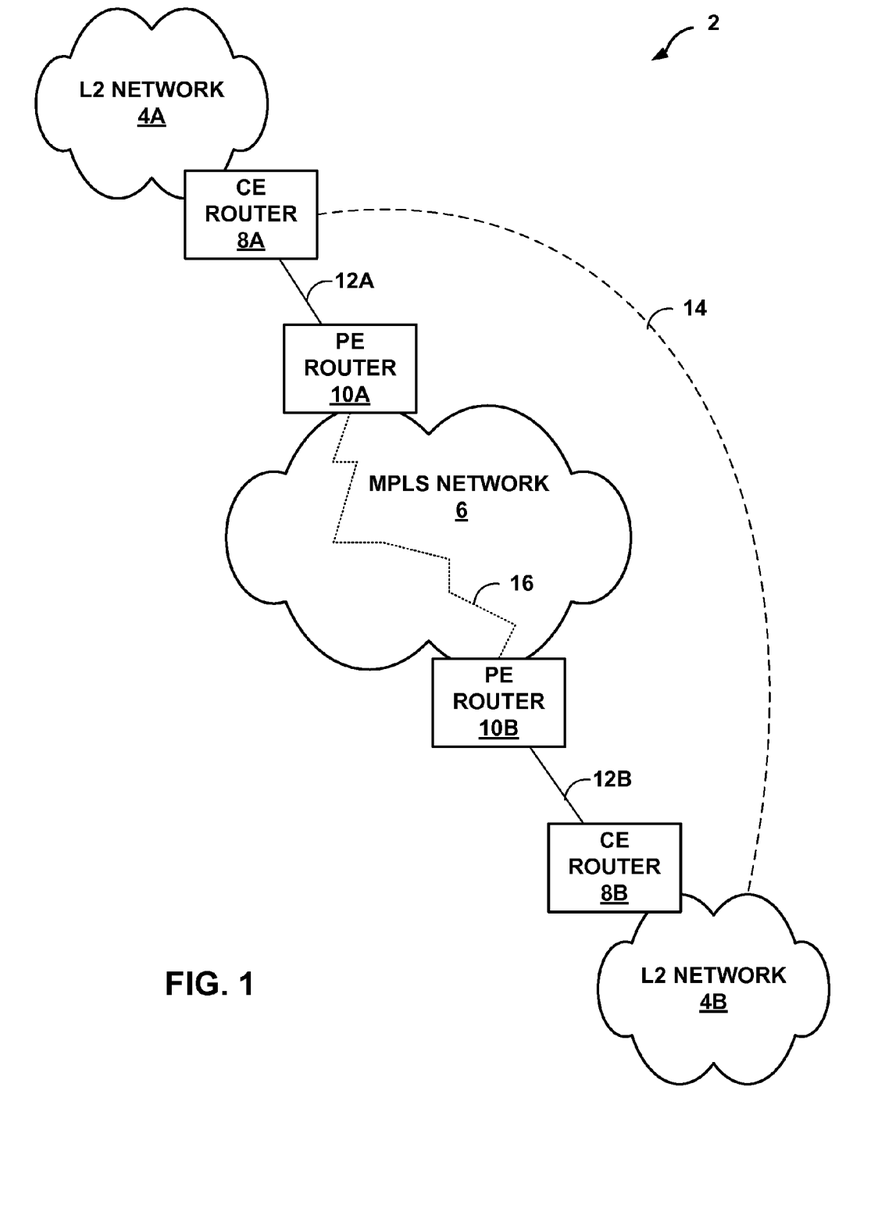
FIG. 1 is a block diagram illustrating an example system that provides Quality of Service (QoS) guarantees when coupling layer two (L2) networks via an intermediate Multi-protocol Label Switching network.

FIG. 1 is a block diagram illustrating an example system 2 that provides QoS guarantees when coupling layer two (L2) networks 4A and 4B (collectively, "L2 networks 4") via an intermediate Multi-Protocol Label Switching (MPLS) network 6. By coupling L2 networks 4, MPLS network 6 acts as a transport network for an L2 connection. In one example, each of L2 networks 4 comprises an ATM network, and MPLS network 6 transports ATM cells between L2 networks 4. Other exemplary types of L2 networks include Frame Relay networks using Data Link Connection Identifiers (DLCIs), networks using High Level Data Link Control (HDLC), Point-to-Point (PPP) connections, PPP sessions from Layer 2 Tunneling Protocol (L2TP) tunnels, and Virtual Local Area Networks (VLANs).

In the exemplary embodiment of FIG. 1, L2 network 4A includes a customer edge (CE) router 8A, and L2 network 4B includes a CE router 8B. CE router 8A of L2 network 4A is coupled to a provider edge (PE) router 10A of MPLS network 6 via link 12A. Similarly, CE router 8B of L2 network 4B is coupled to PE router 10B of MPLS network 6 via link 12B. The techniques described herein can be applied to any networks using LSPs. For example, the techniques can be applied to MPLS networks, networks utilizing the Label Distribution Protocol (LDP), or networks using other label switching protocols. PE routers 10A and 10B provide origination and termination points for Label Switched Path (LSP) 16 within MPLS network 6. In operation, PE routers 10A and 10B receive requests for admission of L2 connections into MPLS network 6. In response to these requests, PE routers 10A and 10B set up or select LSPs, such as LSP 16, that satisfy L2 constraint information associated with the requests. An LSP that satisfies the L2 constraint information more closely emulates a direct L2 connection (shown as dashed line 14 in FIG. 1) between L2 networks 4A, 4B.

For example, PE router 10A may receive a "call admission request" to admit an L2 connection from CE router 8A. When issuing the call admission request, CE router 8A specifies the network destination to which data from L2 network 4A is to be transported, e.g., L2 network 4B. In addition, CE router 8A specifies end-to-end L2 constraint information for the particular L2 connection for which admission is requested. Example L2 constraint information may include bandwidth, color, end-to-end delay, jitter, security requirements, classification of traffic, LSP selection parameters, or other networking characteristics related to transportation of L2 network traffic.

In response to the request, PE router 10A selects an LSP, such as LSP 16, that defines one or more paths to the specified destination. More specifically, a single LSP between PE router 10A and PE router 10B, such as LSP 16, may be defined to include multiple paths. PE router 10A may perform route resolution to inject within its forwarding information an L2 route to the specified destination, e.g., PE router 10B. In addition, PE router 10A analyzes the paths defined by the selected LSP, and selects one or more next hops of one of the paths that best satisfy the received L2 constraint information for use as one or more forwarding next hops of the LSP.

In this manner, the L2 connection is "admitted" into MPLS network 6. Moreover, LSP 16 and the selected forwarding next hop, which have been selected to transport network traffic from the admitted L2 connection, exhibit network characteristics that more closely resemble characteristics of a direct L2 connection 14 between L2 networks 4A and 4B. For example, if the L2 networks 4 include ATM networks, the particular path and forwarding next hop for LSP 16 may be selected during route resolution because they exhibit network characteristics, such as bandwidth and jitter, more similar to those of an ATM circuit than other available paths. Because the selected path more accurately emulates direct L2 connection 14, the transparency of MPLS network 6 to L2 networks 4 may be increased.

Once the path of LSP 16 and it's the corresponding one or more forwarding next hop have been selected, provider edge router 10A accounts for the resources, e.g., bandwidth, within MPLS network 6 utilized by the admitted L2 connection. Provider edge router 10A utilizes this accounting to monitor and adjust the resources available for admission of other L2 connections from L2 network 4A.

Figure 2:
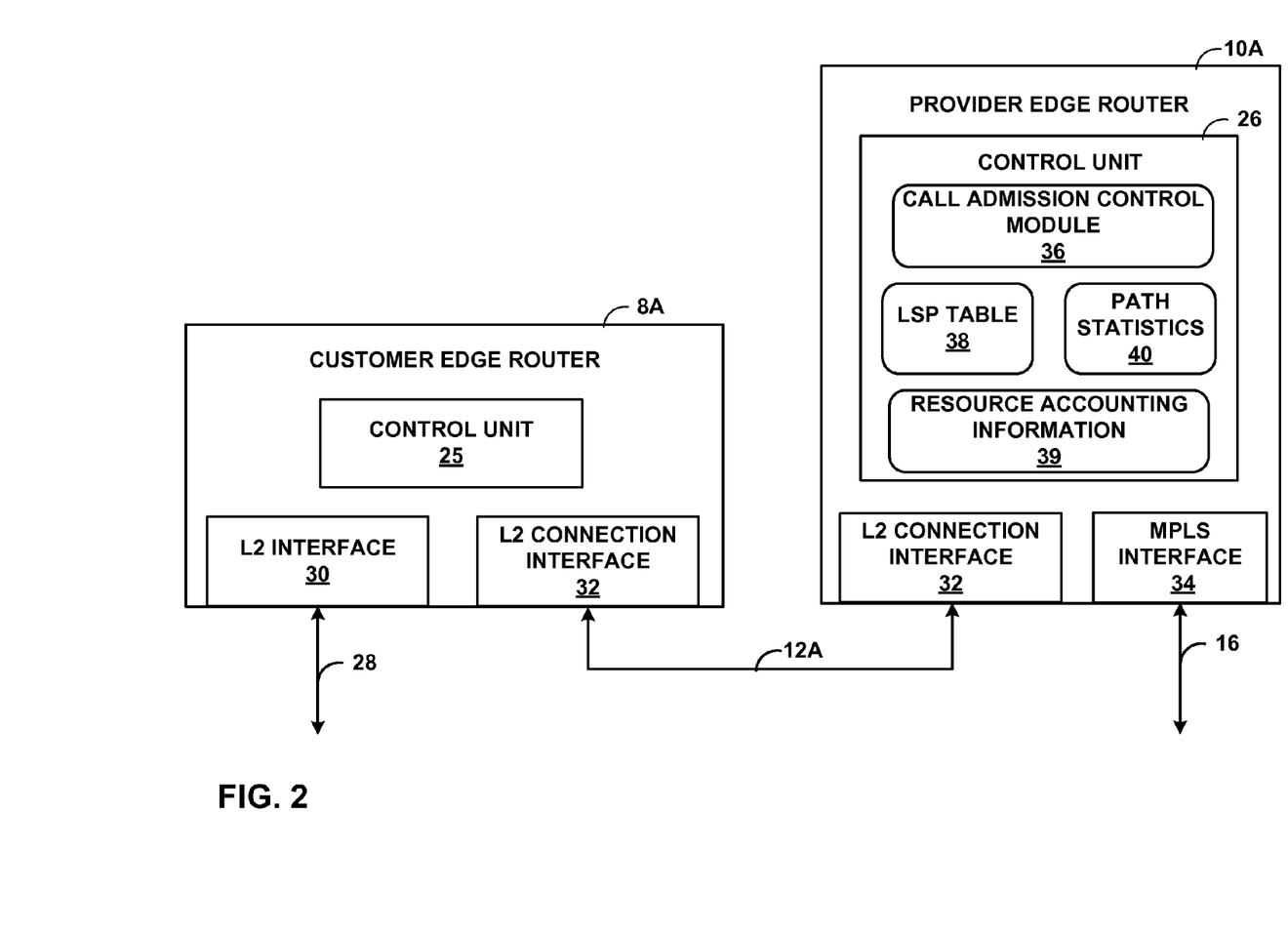
FIG. 2 is a block diagram illustrating a portion of the system from FIG. 1 in further detail.

FIG. 2 is a block diagram illustrating a portion of system 2 in further detail. In particular, FIG. 2 illustrates exemplary embodiments of CE router 8A and PE router 10A. As illustrated, CE router 8A includes a control unit 25, a layer two (L2) interface 30, and an L2 connection interface 32. L2 interface 30 is coupled to an L2 network 4A (FIG. 1) via a link 28. L2 connection interface 32 is coupled to an L2 connection interface 33 of PE router 10A via a link 12A.

PE router 10A includes L2 connection interface 33, an MPLS interface 34, and a control unit 26, which includes a call admission control (CAC) module 36. Control unit 26 maintains a Label Switched Protocol (LSP) table 38 that identifies a set of LSPs, such as LSP 16, for which PE router 10A acts as a point of origin. In addition, LSP table 38 identifies the specific paths and corresponding one or more forwarding next hops that have been selected for carrying traffic from L2 connections.

Control unit 26 monitors the paths and their corresponding one or more next hops specified by LSP table 38, and maintains path statistics 40 that provide information on one or more network characteristics for the paths and the one or more next hops. In another embodiment, path statistics 40 are stored in a location external from PE router 10A, such as within a centralized repository.

CE router 8A issues call admission requests to PE router 10A in order to request admission of L2 connections into MPLS network 6. In particular, CE router 4A issues a request that specifies L2 constraint information based upon the type of L2 connection to be admitted, i.e., the type of L2 connection from which data is to be transported through MPLS network 6. Alternatively, the L2 connections and their respective L2 constraint information may be provided by an administrator or automated agent.

Upon receiving the request, CAC module 36 of PE router 10A examines LSP table 38 and path statistics 40 to select an LSP and, more specifically, one or more forwarding next hops for the LSP, based on the L2 constraint information received from CE router 4A, thereby admitting the L2 connection to MPLS network 6. In particular, during route resolution, CAC module 36 refers to path statistics 40 and selects a path and associated one or more forwarding next hops that best satisfy the L2 constraint information. For example, path statistics 40 may include data with respect to bandwidth, color, end-to-end delay, jitter, security requirements, classification of traffic, LSP selection parameter, or other networking characteristics for each path and respective one or more forwarding next hops maintained by PE router 10A.

Once the LSP and the one or more forwarding next hops have been identified, CAC module 36 accesses LSP table 38 to retrieve L2 connection parameters associated with the selected LSP and the one or more forwarding next hops. PE router 10A then sends the L2 connection parameters to CE router 8A. CE router 8A utilizes the parameters to form, for example, L2 encapsulated packets from the network traffic of the newly admitted L2 connection, and sends the packets to PE router 22 via link 12A. PE router 10A receives the packets, encapsulates the packets in accordance with MPLS protocol and forwards these MPLS packets along the selected LSP, such as LSP 16, in MPLS network 6.

In one embodiment, control unit 26 of PE router 10A maintains resource accounting information 39 that specifies the current resources available for the paths provided by PE router 10A. PE router 10A performs an accounting of network resources, e.g., bandwidth, and updates resource accounting information 39 upon admitting or terminating an L2 connection. PE router 10A may, for example, maintain an accounting of bandwidth available through the paths defined within LSP table 38. PE router 10A utilizes this accounting to monitor and adjust the resources available for admission of other L2 connections from L2 network 4A.

In general, the functionality described in reference to control units 25 and 26 of CE router 8A and PE router 10A, respectively, may be implemented as executable instructions fetched from computer-readable media. Examples of such media may include random access memory (RAM), read-only memory (ROM), non-volatile random access memory (NVRAM), electrically erasable programmable read-only memory (EEPROM), flash memory, and the like. Moreover, the functionality may be implemented by executing the instructions of the computer-readable medium with one or more processors, discrete hardware circuitry, firmware, software executing on a programmable processor, or a combination of any of the above.

Figure 3A:
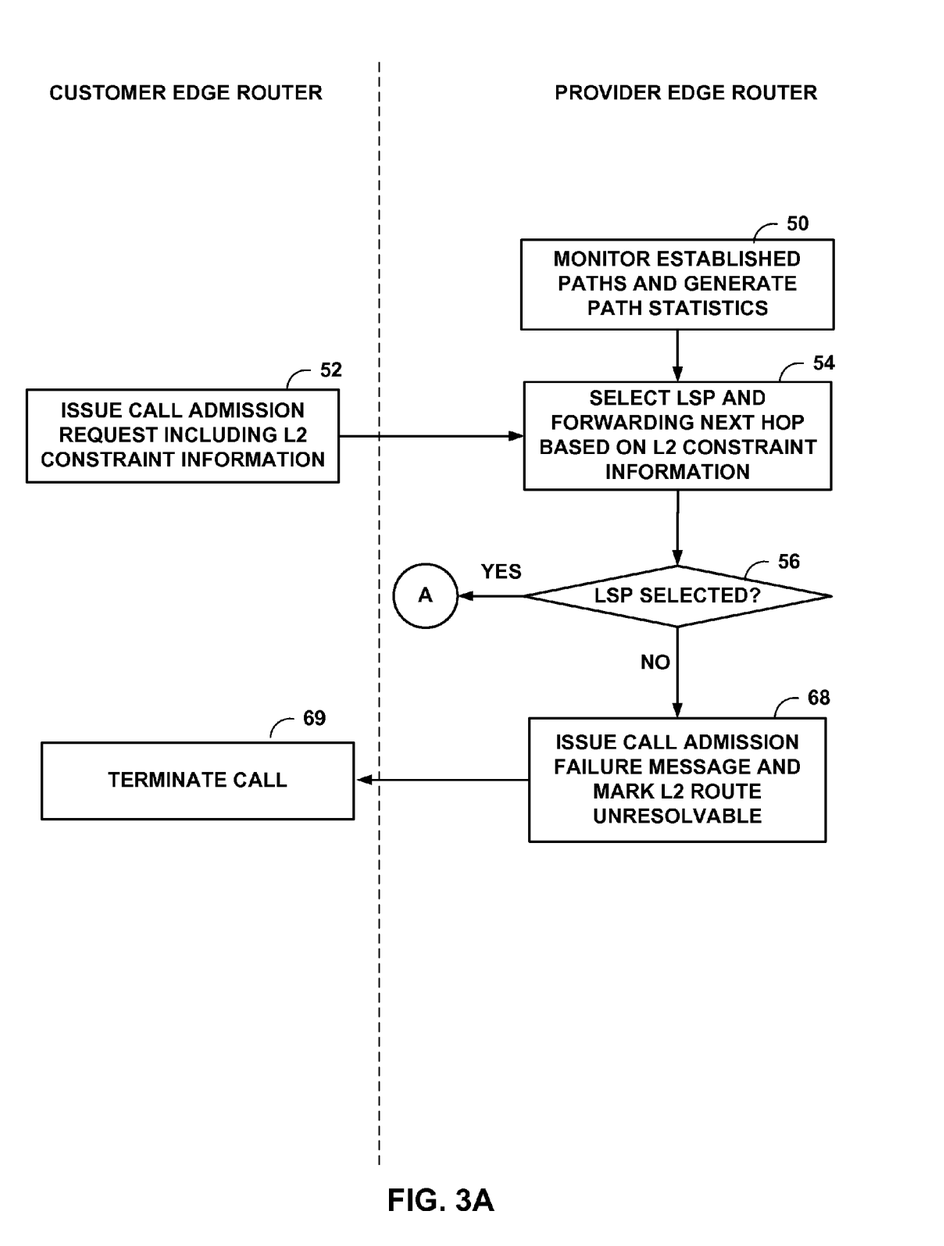
FIGS. 3A and 3B are flow diagrams illustrating an example mode of operation of a customer edge router and a provider edge router in accordance with the principles of the invention.
Figure 3B:
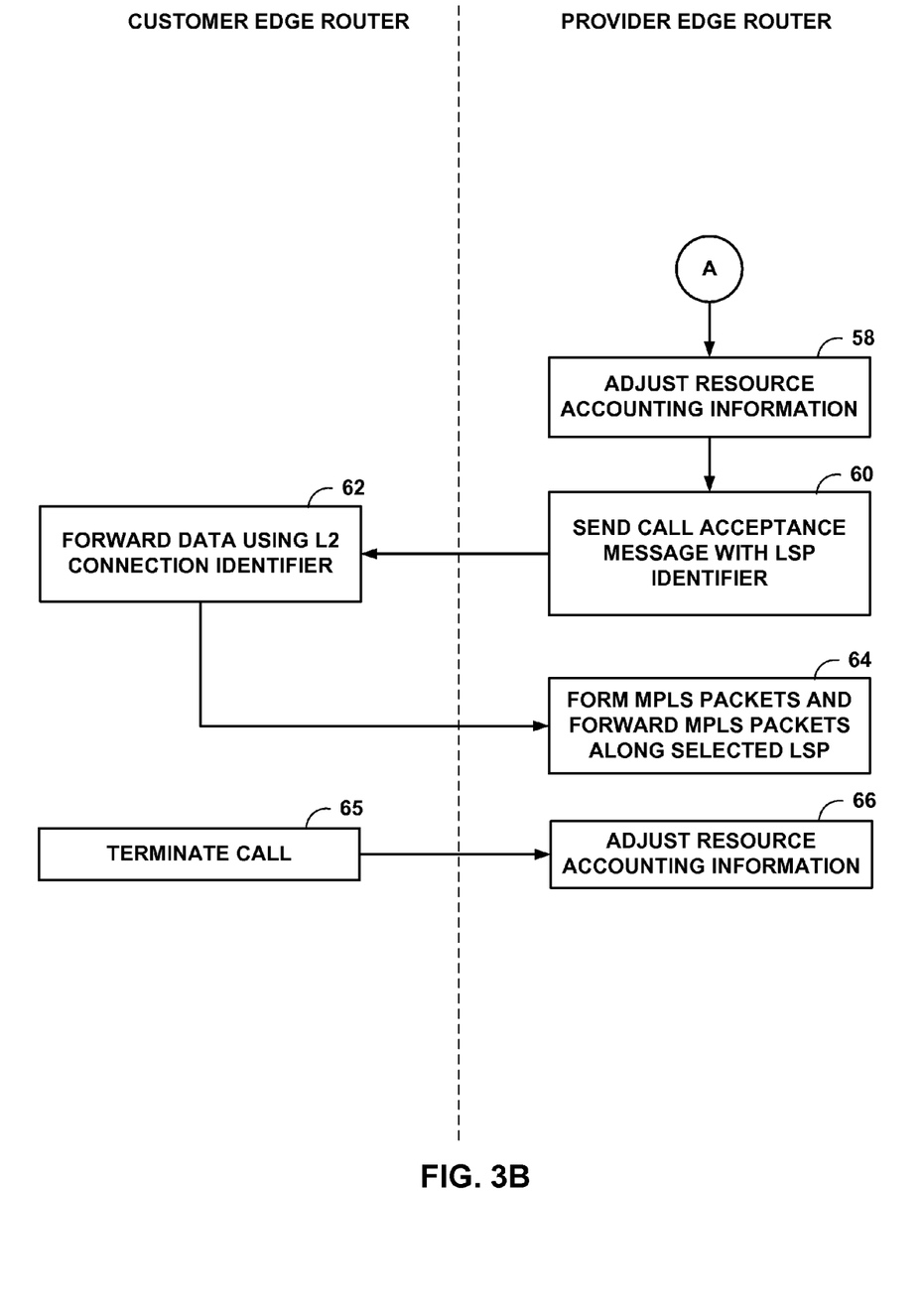

FIGS. 3A-3B are flow diagrams illustrating an example mode of operation of a CE router and a PE router in accordance with the principles of the invention. For exemplary purposes, the flow diagram will be described in reference to CE router 8A and PE router 10A of FIG. 1.

As shown, PE router 10A monitors the network characteristics of established LSPs, e.g., LSP 16, and, more specifically, paths and one or more next hops defined for the LSPs. PE router 10A maintains path statistics 40 based on the observed behavior (50). In particular, PE router 10A monitors characteristics of the LSPs that generally relate to L2 end-to-end constraints. For example, PE router 10A may monitor bandwidth, color, end-to-end delay, jitter, security requirements, classification of traffic, and other characteristics of the LSPs. The particular characteristics monitored by PE router 10A may be configurable, such as by an administrator or automated client, or may be defined by client CE routers, such as CE router 8A.

CE router 8A issues call admission requests to PE router 10A in order to request admission of an L2 connection into MPLS network 6. With each call admission request, CE router 8A specifies L2 constraint information based on the particular L2 connection for which admission is requested (52). Upon receiving the constraint information and the admission request, PE router 10A invokes CAC module 36 to select an LSP defined between PE router 10A and PE router 10B, and identifies one or more forwarding next hops for the LSP that best satisfies the L2 constraint information for the particular L2 connection for which admission is requested (54). The operation of PE router 10A in selecting an LSP and one or more forwarding next hops is described in further detail below in reference to FIG. 4.

In the event a suitable LSP and forwarding next hop can be identified (YES of 56), PE router 10A adjusts resource accounting information 39, e.g., records the allocated bandwidth, to reflect the resources consumed by the newly admitted L2 connection (58). In particular, CAC module 36 maintains resource accounting information 39 on a per-path basis. In other words, CAC module 36 maintains resource accounting information 39 for each path defined for the LSPs originating from PE router 10A. For each path, for example, CAC module 36 reserves bandwidth for each L2 connection "admitted" to the paths, where the amount of bandwidth reserved on a path equals the desired bandwidth for the L2 connections admitted to that path. PE router 10A issues an acceptance message to CE router 8A indicating that the L2 connection has been admitted, and includes within the message an L2 connection identifier associated with the selected LSP (60).

Assuming a suitable LSP and one or more forwarding next hops are identified, CE router 8A receives the acceptance message and utilizes the L2 connection identifier to form packets or other units for the data carried by the admitted L2 connection (62). CE router 8A forwards the packets to PE router 10A, which forms MPLS packets and forwards the MPLS packets in accordance with the attached L2 connection identifier, i.e., along the selected LSP utilizing the forwarding next hop selected for the LSP based on the L2 constraint information (64). In the event the resources for a given LSP become insufficient for transporting the packets, PE router 10A may automatically attempt to select a different LSP and forwarding next hop based on the L2 constraints associated with the particular L2 connection.

Once CE router 8A finishes sending the packets along the L2 connection, the connection, or "call" may terminate (65). Upon termination, PE router 10A adjusts resource accounting information 39 to reflect the newly available resources, e.g., bandwidth, no longer allocated to the particular path (66).

In the event PE router 10A is not able to identify a suitable LSP (YES of 56), CAC module 36 issues a notification of admission control failure to CE router 8A (68 of FIG. 3B). In some instances, CE router 8A responds by sending one or more additional requests for admittance of the L2 connection. CE router 8A may terminate the call after a certain number of failed attempts or may immediately terminate the call after a single failed attempt (69).

Figure 4:
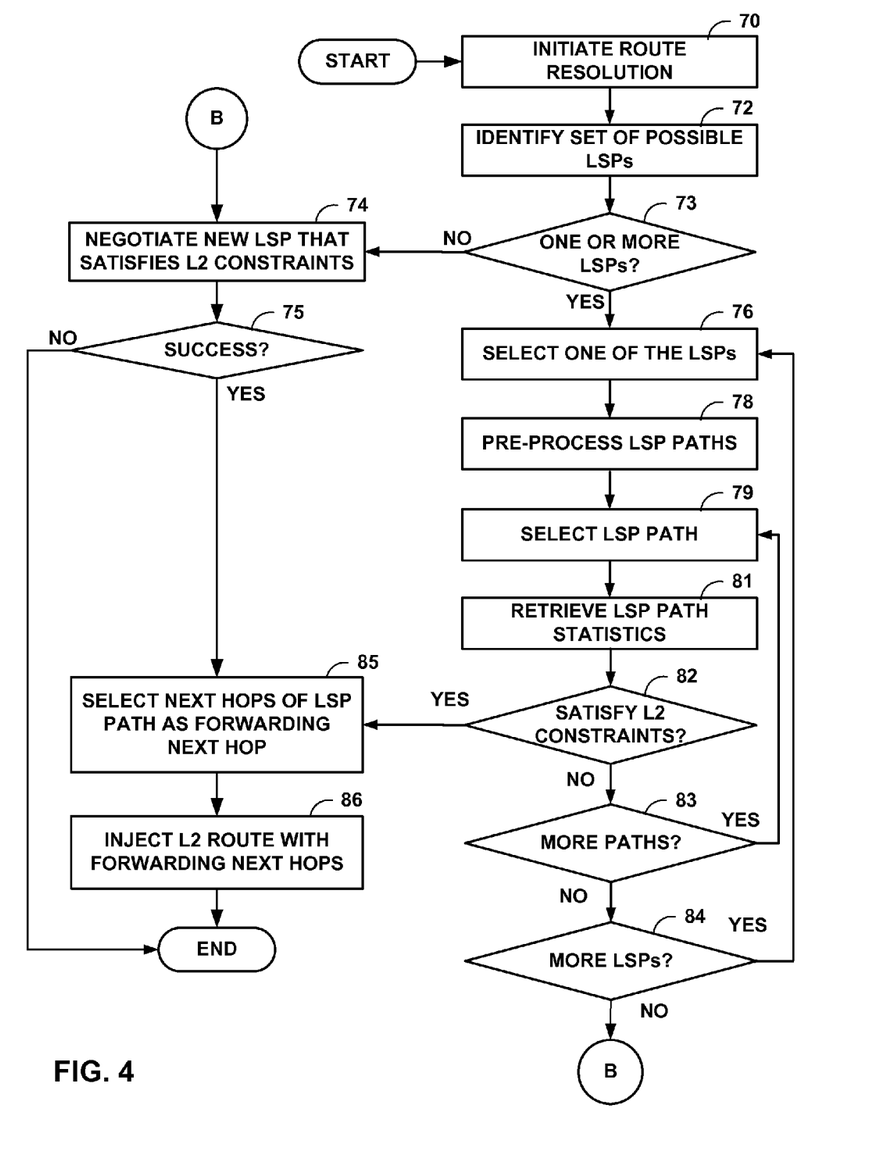
FIG. 4 is a flow diagram that further illustrates exemplary operation of a provider edge router when selecting a label switched path (LSP) and, in particular, selecting an path and forwarding next hop for the LSP, based on L2 constraint information received from a customer edge router.

FIG. 4 is a flow diagram that further illustrates exemplary operation of PE router 10A when selecting an LSP and, in particular, selecting a path and one or more forwarding next hops for the LSP, based on L2 constraint information received from CE router 8A, i.e., block 54 of FIG. 3.

In general, CAC module 36 is invoked during route resolution after receiving a call admission request from CE router 8A. More specifically, upon receiving a call admission request, PE router 10A invokes route resolution (70) in an attempt to inject within its forwarding information an L2 route to the specified destination, e.g., PE router 10B. During route resolution, PE router 10A initially identifies the LSPs originating from PE router 10A and terminating with the specified destination, e.g., PE router 10B (72).

In the event one or more LSPs exist (73), PE router 10A selects one of the LSPs (76), and pre-processes the selected path to eliminate any paths that are not to be considered (78). More specifically, a single LSP between PE router 10A and PE router 10B, such as LSP 16, may be defined to include multiple paths. PE router 10A may apply, for example, policy-based next hop selection to influence the path selection process. For example, a user may define a policy that only allows certain types of traffic to be transported over the LSP.

Next, PE router 10A invokes CAC module 36 for performing constraint-based route resolution for each path of the selected LSP. In particular, CAC module 36 selects one of the paths for the LSP (79), and retrieves the associated statistics from path statistics 40 (81). CAC module 36 then assesses the next hop associated with the selected path to determine whether the next hop satisfies the L2 constraint information for the L2 connection being admitted (82). If not, CAC module 36 determines whether additional paths for the LSP remain for consideration (83), and repeats the process of selecting and assessing the paths (79, 81, 82) until either a satisfactory path is identified or all of the paths for the selected LSP have been assessed. If no path of the currently selected LSP satisfies the L2 constraints, CAC module 36 determines whether additional LSPs remain for consideration (84), and repeats the process for a different one of the LSPs between router 10A and PE router 10B (76-83).

In the event that no forwarding next hop for any path of any of the LSPs satisfies the L2 constraints (NO branch of 84) or no LSPs currently exist (NO branch of 73), PE router 10A may attempt to dynamically negotiate a new LSP with the destination router, e.g., PE router 10B, and any intermediate routers to dynamically signal an LSP that satisfies the L2 constraint information (74). In some embodiments, PE router 10B may act in accordance with a policy that dictates whether to attempt to negotiate new LSPs based on the L2 connection request or attempt to test existing LSPs against the L2 constraints.

In the event one or more next hops for one of the paths satisfy the L2 constraints (YES branch of 82) or upon successful negotiation of a new LSP (YES branch of 75), CAC module 36 selects that path and its corresponding next hop as the forwarding next hop for the LSP (85). In this manner, CAC module 36 selects the appropriate one or more forwarding next hops of an LSP between PE router 10A and PE router 10B based on the L2 constraint for the specific L2 connection being admitted. Consequently, CAC module 36 may be viewed as one or more forwarding next hops selection mechanism that is invoked during route resolution. PE router 10A injects within its forwarding information an L2 route to the specified destination (86). Specifically, the injected L2 route utilizes the identified LSP and, in particular, the identified path and its corresponding next hop.

In the event, no established LSPs satisfy the L2 constraints (NO branch of 84) and a new LSP cannot be dynamically negotiated that satisfies the L2 constraints (NO branch of 75), PE router 10A may issue a call admission failure message, as described above in reference to FIG. 3A.

Various embodiments of the invention have been described, and the principles of the invention may be readily applied to a variety of network devices. Although the techniques of the invention have been described in reference to MPLS networks, the techniques can be applied to any networks using LSPs. A Label Distribution Protocol (LDP) network, for example, is another exemplary network that can benefit by using the techniques set forth in the specification. In addition, the techniques have been described as elements that may be embodied within a single network device or distributed to multiple devices. The terms "system" and "apparatus" are used herein to generally refer to embodiments of the invention in which the described elements are embodied within a single network device or distributed to multiple network devices. These and other embodiments are within the scope of the following claims.

The invention claimed is:

1. A method for transporting data from a layer two (L2) connection coupling an L2 network to a Multi-protocol Label Switching (MPLS) network, the method comprising:

receiving, at an ingress device positioned at an edge of the MPLS network, a request to transport data associated with the L2 connection from the L2 network to the MPLS network, wherein the request specifies constraint information for one or more characteristics of the L2 connection from the L2 network to the MPLS network, and wherein the request is received from a network device positioned within the L2 network and external to the MPLS network;

selecting, with the ingress device, a label switched path (LSP) from a plurality of LSPs of the MPLS network based on the constraint information for the L2 connection from the L2 network to the MPLS network;

issuing a call admission message from the ingress device to the network device positioned within the L2 network in response to the request, wherein the call admission message includes an L2 connection identifier associated with the selected LSP;

after issuing the call admission message, receiving with the ingress device a packet from the L2 connection, wherein the packet includes data and the L2 connection identifier included within the call admission message; and forwarding, with the ingress device, the data received from the L2 connection through the MPLS network via the selected LSP.

2. The method of claim 1, wherein the request specifies a network destination to which the data from the L2 connection is to be transported, and wherein selecting an LSP comprises selecting an LSP based on the constraint information and the network destination.

3. The method of claim 2, wherein selecting an LSP comprises selecting the LSP based on a next hop that satisfies the constraint information.

4. The method of claim 1, wherein selecting an LSP comprises:
monitoring network characteristics of a set of LSPs within the MPLS network;
generating statistical data for the set of LSPs based on the monitored network characteristics;
comparing the constraint information for the L2 connection from the L2 network to the MPLS network to the statistical data for the set of LSPs through the MPLS network; and
selecting the LSP from the set of LSPs based on the comparison.

5. The method of claim 1, wherein selecting an LSP comprises:
negotiating a new LSP to satisfy the constraint information; and
identifying one or more new next hops associated with the new LSP based on the negotiation.

6. The method of claim 1, further comprising:
identifying a set of paths associated with the selected LSP; and
selecting one of the paths based on the constraint information, and
wherein forwarding the data comprises forwarding the data via the selected path.

7. The method of claim 6, wherein selecting one of the paths associated with the selected LSP comprises applying a configurable policy to select one of the paths.

8. The method of claim 1, further comprising:
establishing the LSP as one of a plurality of LSPs, wherein each of the LSPs define one or more paths, each path having an associated next hop;
monitoring network characteristics for each of the next hops; and
generating statistical data for the next hops based on the monitored network characteristics.

9. The method of claim 8, wherein selecting an LSP comprises:
comparing the constraint information to the statistical data; and
selecting one of the next hops and its associated path when the next hop satisfies the constraint information.

10. The method of claim 9, further comprising updating forwarding information of a router to insert a route for transporting the data from the L2 connection, wherein the route specifies the selected one of the next hops as a forwarding next hop for the selected LSP.

11. The method of claim 9, further comprising issuing an admission acceptance message upon selecting the one of the next hops.

12. The method of claim 8, further comprising:
updating forwarding information of a router to insert a route to a network destination specified by the request; and
marking the route as unresolved when the statistical data for the next hops of the paths fails to satisfy the constraint information.

13. The method of claim 8, further comprising issuing an admission failure message when the statistical data for the next hops fails to satisfy the constraint information.

14. The method of claim 8, further comprising:
pre-processing the paths to reject one or more of the paths; and
selecting one or more of the next hops and its associated path from the remaining paths.

15. The method of claim 1, wherein selecting an LSP comprises applying a policy to select the LSP based on the constraint-information.

16. The method of claim 1, further comprising:
establishing the LSP as one of a plurality of LSPs; maintaining resource accounting information that indicates an available amount of network resources for the plurality of LSPs;
adjusting the resource accounting information to reflect the resources consumed by the L2 connection upon selecting the LSP; and
selectively accepting or rejecting a subsequent admission request for transporting data from a second L2 connection based on the adjusted resource accounting information.

17. The method of claim 16,
wherein selectively accepting or rejecting a subsequent admission request comprises comparing the constraint information to the adjusted resource accounting information; and
rejecting the subsequent admission request when the constraint information specifies an amount of required resources that exceeds an available amount of resources for the plurality of LSPs specified by the adjusted resource accounting information.

18. The method of claim 16,
wherein each of the LSPs define one or more paths, each path having an associated next hop, and
wherein maintaining resource accounting information comprises maintaining respective resource accounting information for each path.

19. The method of claim 1, wherein receiving a request comprises receiving the request from an administrator or automated agent.

20. The method of claim 1,
wherein the L2 connection comprises an asynchronous transfer mode (ATM) circuit and the data comprises ATM cells, and
wherein forwarding the data comprises assigning labels to the cells to form packets.

21. The method of claim 1, wherein forwarding the data comprises forwarding the data in accordance with one of a Label Distribution Protocol (LDP) and MPLS protocol.

22. The method of claim 1, wherein the constraint information specifies one or more of a bandwidth, a color, an end-to-end delay, a jitter, a security requirement, and a classification of traffic for the L2 connection.

23. The method of claim 1, wherein the L2 connection comprises one of an asynchronous transfer mode (ATM) circuit, a Frame Relay communication link, a communication link using the High Level Data Link Control (HDLC) protocol, a Point-to-Point (PPP) connection, a PPP session from a L2 Tunneling Protocol (L2TP) tunnel, and a Virtual Local Area Network (VLAN) connection.

24. A method comprising:
issuing a call admission request from a first network device positioned within a layer two (L2) network to a second network device operating as an ingress device to a Multi-protocol Label Switching (MPLS) network, wherein the second network device is positioned at an edge of the MPLS network, and wherein the first network device is external to the MPLS network, wherein the call admission request requests transportation of data from an L2 connection from the L2 network to the MPLS network and specifies constraint information for one or more characteristics of the L2 connection;
receiving, with the first network device within the L2 network, a call admission message from the ingress device of the MPLS network in response to the call admission request, wherein the call admission message specifies a L2 connection identifier associated with a label switched path (LSP) selected from a plurality of LSPs by the ingress device based on the characteristics of the L2 connection, wherein the ingress device is configured to operate as an ingress of the selected LSP;
assigning the L2 connection identifier to the data of the L2 connection to form packets; and
forwarding the packets from the first network device within the L2 network to the ingress device associated with the MPLS network.

25. The method of claim 24, wherein the constraint information specifies one or more of a bandwidth, a color, an end-to-end delay, a jitter, a security requirement, and a classification of traffic for the L2 connection.

26. The method of claim 24, wherein the L2 connection comprises one of an asynchronous transfer mode (ATM) circuit, a Frame Relay communication link, a communication link using the High Level Data Link Control (HDLC) protocol, a Point-to-Point (PPP) connection, a PPP session from a Layer 2 Tunneling Protocol (L2TP) tunnel, and a Virtual Local Area Network (VLANs) connection.

27. A network apparatus configured to operate as an ingress of a Multi-protocol Label Switching (MPLS) network and positioned at an edge of the MPLS network, the network apparatus comprising:
a control unit comprises hardware configured to receive a request to transport data associated with a layer two (L2) connection coupling an L2 network to the MPLS network,
wherein the request specifies constraint information for one or more characteristics of the L2 connection,
wherein the control unit receives the request from a network device positioned within the L2 network and external to the MPLS network,
wherein the control unit selects a label switched path (LSP) in response to the request based on the constraint information, and issues a call admission message to the network device positioned within the L2 network in response to the request,
wherein the call admission message includes an L2 connection identifier associated with the selected LSP, and
wherein the control unit, after issuing the call admission message, receives a packet from the L2 connection that includes data and the L2 connection identifier included within the call admission message, and forwards the data from the L2 connection via the selected LSP.

28. The network apparatus of claim 27, wherein the control unit comprises a call admission control module comprising hardware configured to maintain an LSP table that identifies a set of LSPs originating from the network apparatus, and selects one of the set of LSPs from the LSP table based on the constraint information of the L2 connection.

29. The network apparatus of claim 28, wherein the call admission control module identifies next hops associated with the set of LSPs, identifies one of the next hops that satisfies the constraint information, and selects the one of the set of LSPs based on the identified next hop.

30. The network apparatus of claim 27, wherein the control unit selects an LSP by negotiating a new LSP to satisfy the constraint information.

31. The network apparatus of claim 27, wherein the control unit comprises a call admission control module comprising hardware configured to monitor network characteristics of a set of LSPs originating from the network apparatus, and generates statistical data for the set of LSPs based on the monitored network characteristics.

32. The network apparatus of claim 31, wherein the call admission control module compares the constraint information to the statistical data and selects the LSP from the set of LSPs based on the comparison.

33. The network apparatus of claim 27, wherein the control unit comprises a call admission control module comprising hardware configured to identify a set of paths associated with the LSP, identifies next hops associated with the paths, and selects one of the next hops and its associated path based on the constraint information, and wherein the control unit forwards the data from the L2 connection via the selected path and its associated next hop.

34. The network apparatus of claim 33, wherein the call admission control module pre-processes the paths to reject one or more of the paths, and selects one of the next hops and its associated path from the remaining paths.

35. The network apparatus of claim 34, wherein the call admission control module applies a configurable policy to reject or select one or more of the paths.

36. The network apparatus of claim 34,
wherein the network apparatus comprises a network router,
wherein the control unit maintains forwarding information in accordance with a topology of the MPLS network, and
wherein the control unit updates the forwarding information to insert a route for transporting the data from the L2 connection, wherein the route specifies the selected one of the next hops as one or more forwarding next hops for the selected LSP.

37. The network apparatus of claim 33,
wherein the control unit maintains an LSP table that identifies a set of LSPs originating from the network apparatus, and resource accounting information that indicates an available amount of network resources for the set of LSPs, and
wherein the call admission control module adjusts the resource accounting information to reflect the resources consumed by the L2 connection upon selecting the LSP, and selectively accepts or rejects a subsequent admission request for transporting data from a second L2 connection based on the adjusted resource accounting information.

38. The network apparatus of claim 37,
wherein each of the LSPs define one or more paths, each path having an associated next hop, and
wherein the control unit maintains respective resource accounting information for each path.

39. The network apparatus of claim 27,
wherein the L2 connection comprises an asynchronous transfer mode (ATM) circuit and the data comprises ATM cells, and
wherein the control unit assigns labels to the cells to form Multiprotocol Label Switching (MPLS) packets.

40. The network apparatus of claim 27, wherein the constraint information specifies one or more of a bandwidth, a color, an end-to-end delay, a jitter, a security requirement, and a classification of traffic for the L2 connection.

41. The network apparatus of claim 27, wherein the L2 connection comprises one of an asynchronous transfer mode (ATM) circuit, a Frame Relay communication link, a communication link using the High Level Data Link Control (HDLC) protocol, a Point-to-Point (PPP) connection, a PPP session from a L2 Tunneling Protocol (L2TP) tunnel, and a Virtual Local Area Network (VLAN) connection.

42. A system comprising:
a first layer two (L2) network having a network device and at least one L2 connection;
a second L2 network; and
a Multi-protocol Label Switching (MPLS) network between the first L2 network and the second L2 network, the network device of the first L2 network being external to the MPLS network and coupled to the MPLS network by the L2 connection,
wherein the MPLS network includes an edge router positioned at an edge of the MPLS network to receive a request from the network device of the first L2 network to transport data from the L2 connection to the second L2 network, wherein the request specifies one or more characteristics of the L2 connection, and
wherein the router is configured to select a label switched path (LSP) of the MPLS network based on the characteristics of the L2 connection of the first L2 network, issue a call admission message to the network device positioned within the first L2 network in response to the request,
wherein the call admission message includes an L2 connection identifier associated with the selected LSP,
wherein, after issuing the call admission message, the router receives a packet from the L2 connection, wherein the packet includes data and the L2 connection identifier included within the call admission message, and
wherein the router forwards the data received from the L2 connection through the MPLS network to the second L2 network via the selected LSP.

43. The system of claim 42, wherein the router maintains forwarding information in accordance with a topology of the MPLS network, and updates the forwarding information to insert a route for transporting the data from the L2 connection.

44. The system of claim 42, wherein the router performs route resolution in response to the request, and selects the LSP during route resolution based on the constraint information.

45. The system of claim 42, wherein the router identifies a set of one or more paths associated with the LSP, and during route resolution selects one or more forwarding next hops from one of the paths that satisfy the constraint information.

46. The system of claim 42, wherein the router maintains resource accounting information for each path of a set of LSPs originating from the router, and wherein the router selectively accepts or rejects the request based on the resource accounting information.

47. A non-transitory computer-readable medium comprising instructions for causing a processor to:
receive, at an ingress device positioned at an edge of a Multi-protocol Label Switching (MPLS) network a request to transport data from a layer two (L2) connection coupling an L2 network to the MPLS network, wherein the request specifies constraint information for one or more characteristics of the L2 connection from the L2 network to the MPLS network, and wherein the request is received from a network device positioned within the L2 network and external to the MPLS network;
select a label switched path (LSP) of the MPLS network based on the constraint information for the L2 connection from the L2 network to the MPLS network;
issue a call admission message from the ingress device to the network device positioned within the L2 network in response to the request, wherein the call admission message includes an L2 connection identifier associated with the selected LSP;
receive a packet from the L2 connection with the ingress device after the call admission message is issued, wherein the packet includes data and the L2 connection identifier included within the call admission message; and
forward, with the ingress device, the data received from the L2 connection through the MPLS network via the selected LSP.

* * * * *